(12) United States Patent
Myung et al.

(10) Patent No.: US 9,203,608 B2
(45) Date of Patent: Dec. 1, 2015

(54) SYSTEM FOR ENCRYPTING DATA WITH AN ERROR CORRECTION CODE

(75) Inventors: Seho Myung, Seoul (KR); Hyunkoo Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 703 days.

(21) Appl. No.: 13/591,875

(22) Filed: Aug. 22, 2012

(65) Prior Publication Data

US 2013/0051556 A1 Feb. 28, 2013

(30) Foreign Application Priority Data

Aug. 22, 2011 (KR) ........................ 10-2011-0083211

(51) Int. Cl.
*H04K 1/02* (2006.01)
*H04L 9/00* (2006.01)
(52) U.S. Cl.
CPC ............... *H04L 9/00* (2013.01); *H04L 2209/34* (2013.01)

(58) Field of Classification Search
USPC .......................................................... 380/252
See application file for complete search history.

(56) References Cited

U.S. PATENT DOCUMENTS

2003/0012372 A1* 1/2003 Cheng .............................. 380/28
2010/0080312 A1* 4/2010 Moffatt et al. ................ 375/260

* cited by examiner

*Primary Examiner* — Tu Nguyen
(74) *Attorney, Agent, or Firm* — The Farrell Law Firm, P.C.

(57) ABSTRACT

An encryption method and apparatus is provided for increasing the security of encrypted data by puncturing or repeating a part of coded data. The data encryption method includes converting data to be encrypted using a certain encryption function; generating a codeword by performing ECC encoding on the converted data; puncturing a part of the converted data included in the codeword; interleaving the punctured data; and inserting errors to the interleaved data.

14 Claims, 11 Drawing Sheets

SYSTEM FOR ENCRYPTING DATA WITH AN ERROR CORRECTION CODE

PRIORITY

This application claims priority under 35 U.S.C. §119(a) to Korean Patent Application Serial No. 10-2011-0083211, which was filed on Aug. 22, 2011 in the Korean Intellectual Property Office, the entire disclosure of which is incorporated herein by reference.

BACKGROUND OF THE INVENTION

1. Field of the Invention

The present invention relates generally to an encrypting system using an Error Correction Code (ECC) and, in particular, to an encryption method and apparatus providing increased protection for data from an external attack by puncturing or repeating a part of coded data.

2. Description of the Related Art

Typically, an ECC is used to correct errors occurring between a transmitter and a receiver in a communication system. In the error correction process, a given data m with a length of K, which is to be encrypted, is input to an error correction encoder, which generates a parity p with a length of (N−K) for a codeword c=(m, p) with the length N, matching 1:1 with each other, to be transmitted to the receiver. The receiver generates an error vector e with the length of N and receives (c+e). In the decoding process with the error correction code at the receiver, the error vector e is removed to recover the codeword c and, as a consequence, it is also possible to recover the data m.

Here, the codeword c is distorted by the error vector e and thus it is difficult for a system having no error correction capability to recover the data m. With this principle, the ECC can be adopted to an encrypting system.

However, the conventional encrypting system based on the ECC has a drawback in that data may be obtained by unauthorized persons through the repetitive observation and is thus vulnerable to an external attack.

More specifically, when data m is input to an error correction encoder, which outputs codeword c and is then encrypted with a random error vector e in order to be output as encrypted data (c+e), if the feature of the encoder is not known, it is impossible to perform decoding and thus to correct an error, resulting in no encrypted data. However, when the error vector e includes the errors out of the error correction capability of the ECC, decoding is likely to fail even with the knowledge about features of the encoder, such that the error occurrence range of the error vector e has to be in the range of the error correction capability of the ECC.

FIG. 1 is block diagram illustrating a coding procedure of a conventional ECC-based encryption system. Typically, an ECC-based encrypting system as illustrated in FIG. 1 improves an encrypting level.

Referring to FIG. 1, data m is input to an inverse conversion-enabled converter 110. For example, the inverse conversion-enabled conversion may be exemplified by an encrypting process in which a matrix having its inverse matrix is multiplied.

The conversion result is input to an ECC encoder 120 to generate the codeword c, which is input to an interleaver 130 to generate the interleaved result s. Here, the random error vector e generated by the error generator 140 is added to the interleaved result s in order to generate the signal v=(s+e) as final encrypted data. The total number of errors in the error vector e does not exceed the error correction capability of the error correction code.

FIG. 2 is a block diagram illustrating a decoding procedure of a conventional encrypting system with an ECC.

Referring to FIG. 2, in order to decrypt the encrypted data, the receiver performs de-interleaving through a de-interleaver 210, which rearranges the encrypted data, and performs decoding with an ECC through the ECC decoder 220. Finally, the inverse converter 230 acquires an estimated value m' of the original data m. If the number of errors is in the correction capability range of the ECC, m'=m is obvious.

In order for an unauthorized user to recover the data m, the unauthorized user must estimate the information on the converter 110, encoder 120, and interleaver 130. Accordingly, the data is encrypted with 3-stage encrypting level.

Because distortion deteriorates as the number of errors included in the error vector e increases, such an encrypting system shows a good encrypting effect. However, in order to remove such errors, superior ECCs are used. Because the conventional systematic code defined in the form of c=(m, p) in which the parity p is generated for the data m is known to be superior in performance, the system for encrypting data with error correction code is designed based on the systematic code in general. Also, the performance of the systematic code-based encrypting system is improved in proportion to the amount of p. As the amount of p increases, the code-rate of the error correction code decreases, resulting in reduction of data transfer efficiency.

However, the above-described encrypting system has a significant shortcoming as will be described below.

When an unauthorized user continues observing the same data, the unauthorized user may observe the encrypted data corresponding to the data m as follows:

First observation: $v_1 = (s + e_1)$

Second observation: $v_1 = (s + e_2)$

...

$D^{th}$ observation: $v_D = (s + e_D)$

If the user sums up all of the observation results, it can be expressed as shown in Equation (1).

$$\frac{v_1 + v_2 + \ldots + v_D}{D} = s + \frac{e_1 + e_2 + \ldots + e_D}{D} \quad (1)$$

Typically, the error rate in the error vector is less than 50%, because, if the error rate reaches 50%, it is impossible to recover the data with any ECC. When the error rate is less than 50%, the value of $$\frac{e_1 + e_2 + \ldots + e_D}{D}$$

shows a certain tendency.

For example, assuming that the error vectors are binary vectors composed of 0 and 1, and include an error rate less than 50%, for convenience purposes, $$\frac{e_1 + e_2 + \ldots + e_D}{D}$$

is characterized in that each of its elements is less than ½. Theoretically, assuming that the error rate of the error vector is X (<½ and the number of observations is infinite, i.e., the value D is infinite), X can be expressed as shown in Equation (2).

$$\lim_{D \to \infty} \frac{e_1 + e_2 + \ldots + e_D}{D} = (X, X, \ldots, X) \quad (2)$$

Accordingly, the observer can remove the encrypting effect derived by the error vector with a process of Equation (3) through a large number of observations.

$$s' = \frac{v_1 + v_2 + \ldots + v_D}{D} - (X, X, \ldots, X) \quad (3)$$

Due to this shortcoming of the ECC-based encrypting system, if s of FIG. 1 is detected easily and if the converter 110 and interleaver 130 are exposed to other users, the data m is likely to be exposed with the systematic ECC. That is, although the encrypting system uses 3 stages, the role of the ECC may become useless, resulting in basically a two-stage encrypting level.

SUMMARY OF THE INVENTION

The present invention has been made in an effort to solve the above-described problems occurring in the prior art and to provide at least the advantages described below.

An aspect of the present invention is to provide a method for encrypting data with an improved ECC that improves a security level of stored data, as compared to the conventional ECC-based encrypting system.

Another aspect of the present invention is to provide a method and apparatus for encrypting data with an ECC providing increased protection for encrypted data from an external attack, by puncturing and/or repeating a part of the encrypted data.

Another aspect of the present invention is to provide a method and apparatus for encrypting data with an ECC that improves encrypting and decrypting data efficiency.

In accordance with an aspect of the present invention, a data encryption method of an ECC-based encryption apparatus is provided. The method includes converting data to be encrypted using a certain encryption function; generating a codeword by performing ECC encoding on the converted data; puncturing a part of the converted data included in the codeword; interleaving the punctured data; and inserting errors to the interleaved data.

In accordance with another aspect of the present invention, an encryption apparatus for encrypting data based on an ECC is provided, which includes a converter that converts data to be encrypted using a certain encryption function; an encoder that generates a codeword by encoding the converted data with the ECC; a puncture unit that punctures a part of the converted data included in the codeword; an interleaver that interleaves the punctured data; and an error inserter that inserts errors to the interleaved data.

In accordance with another aspect of the present invention, a data decryption method for decrypting encrypted data in an ECC-based encryption system is provided. The method includes de-interleaving the encrypted data; decoding the de-interleaved data to recover a codeword; and converting the codeword to recover the encrypted data. Converting includes treating a punctured block of the encrypted data as an erasure and treating a non-punctured block of the encrypted data as a block including errors.

In accordance with another aspect of the present invention, a decryption apparatus for decrypting encrypted data in an ECC-based encryption system is provided. The decryption apparatus includes a de-interleaver that de-interleaves the encrypted data; a decoder that decodes the de-interleaved data to recover a codeword; and an inverse-converter that converts the codeword to recover the encrypted data. The decoder treats a punctured block of the encrypted data as an erasure and treats a non-punctured block of the encrypted data as a block including errors.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention are described in detail below with reference to the accompanying drawings. However, detailed description of well-known functions and structures incorporated herein are omitted to avoid obscuring the subject matter of the present invention. Further, terms used herein are defined in consideration of the functionality in the present invention, and may vary according to the intention of a user or an operator, usage, etc. Therefore, the definition of terms used herein should be made on the basis of the overall content of the present specification.

In the following description, an ECC may be any of a parity check matrix-based algebraic code, a convolutional code, an interleaver-based turbo-like code, etc. In the algebraic coding and decoding procedure, because a receiver knows information on a parity check matrix used by a transmitter for coding, it is possible for the receiver to perform decoding with the parity check matrix. When the parity check matrix is not large, a Maximum Likelihood (ML) decoding can be adopted as the optimization decoding algorithm. However, when the parity check matrix is relatively large, general probabilistic decoding is adopted due to the high ML decoding complexity.

Also, for the turbo-like code, because the transmitter and the receiver share the information on the Recursive Systematic Convolutional coder and interleaver structures, it is possible to perform decoding by iteratively applying the probabilistic decoding.

Figure 3:
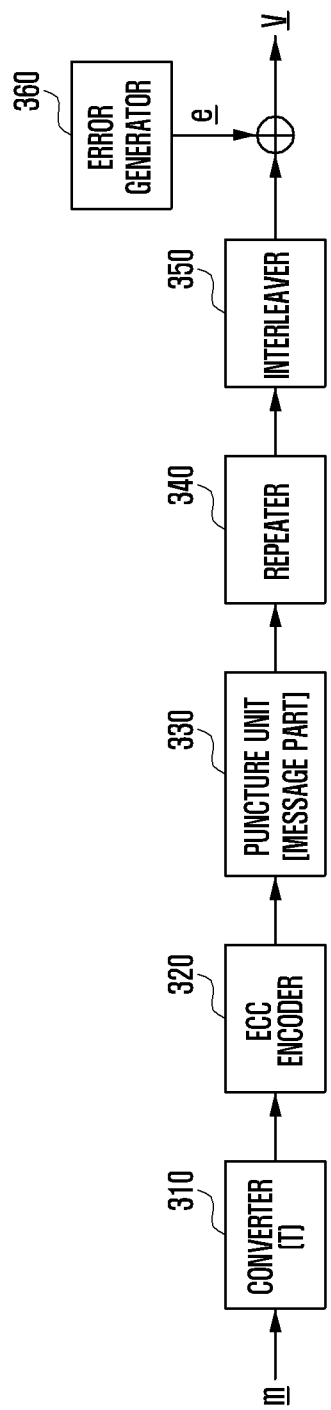
FIG. 3 is a block diagram illustrating an encryption procedure of an ECC-based encryption apparatus according to an embodiment of the present invention.
Figure 4:
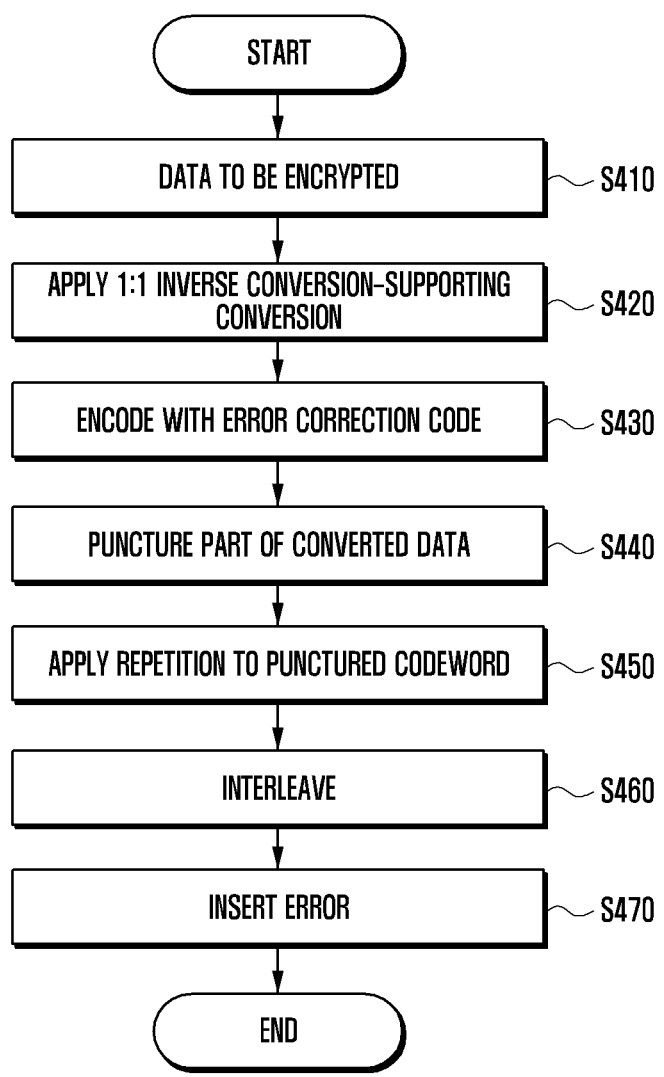
FIG. 4 is a flowchart illustrating an encryption method according to an embodiment of the present invention.

FIG. 3 is a block diagram illustrating an encryption procedure of an ECC-based encryption apparatus according to an embodiment of the present invention, and FIG. 4 is a flowchart illustrating an encryption method according to an embodiment of the present invention.

Figure 1:
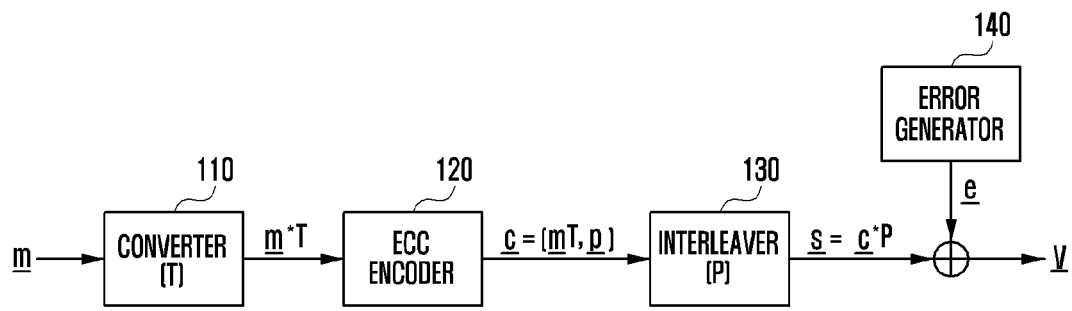
FIG. 1 is block diagram illustrating a coding procedure of a conventional ECC-based encryption system.
Figure 2:
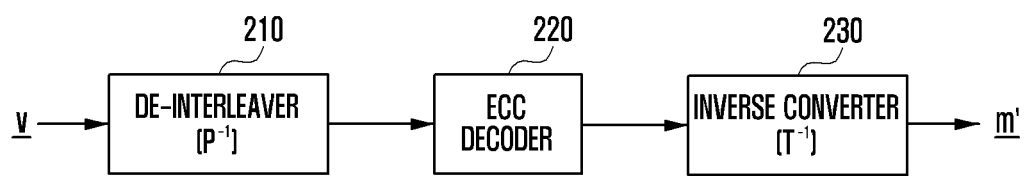
FIG. 2 is a block diagram illustrating a decoding procedure of a conventional ECC-based encryption system.

Compared to the conventional ECC-based encrypting system depicted in FIG. 1, the encrypting apparatus illustrated in FIG. 3 further includes a puncture unit 330 for puncturing a part of the converted data and a repeater 340 for improving error correction capability.

The encrypting apparatus illustrated in FIG. 3 will be described in more detail with reference to the flowchart illustrated in FIG. 4.

Referring to FIG. 4, the encrypting apparatus generates data to be encrypted in step S410. In step 420, the converter 310, which supports 1:1 inverse conversion, converts the data to output converted data. In step S430, an ECC encoder 320 performs a coding process with an ECC to generate a codeword.

In step S440, the puncture unit 330, e.g., a puncturer, punctures a part of the codeword as the converted data. In step S450, the repeater 340 repeats the punctured codeword. For example, the repeater 340 may perform a simple repetition, an irregular repetition, or a skip repetition process.

In step S460, the interleaver 450 interleaves the punctured and/or repeated data, and in step S470, the encrypting apparatus adds an error generated by the error generator 360 to the interleaving result, thereby outputting encrypted data.

The encrypting system of illustrated in FIG. 3 and the conventional encrypting system illustrated in FIG. 1 can be compared as follows.

As described above, the conventional encrypting system has a drawback in that encrypted data may be exposed to an unauthorized user, if the unauthorized use can observe the encrypted data continuously, with the information on the converter 310 and interleaver 350, regardless of the information on the converter 320 and the error generator 360. In order to prevent this problem, the encrypting system illustrated in FIG. 3 includes the puncture unit 330, which punctures a part of the data input to the encoder 320, such that the unauthorized user cannot acquire the punctured part of the input data. Consequently, the unauthorized user cannot estimate the information on the encoder or decoder structure and the punctured part of the data to recover the original data. That is, although the unauthorized user may somehow obtain the information on the converter 310 and the interleaver 350, the unauthorized user still cannot decrypt the data decrypted with the ECC.

Typically, puncturing the information part of a systematic ECC deteriorates performance degradation as compared to puncturing parity part. In case of a Low-Density Parity Check (LDPC) code, puncturing the information part may show superior performance according to the code design scheme and decoding scheme. Particularly, puncturing a part of codewords corresponding to columns assigned high column weights in a parity check matrix shows superior performance. Accordingly, the puncture unit 330 illustrated FIG. 3 does not degrade the error correction capability in the encrypting system with such a code. By arranging the columns assigned high column weight in the parity check matrix of the LDPC code according to a predetermined rule and puncturing the information part corresponding to the corresponding columns partially or entirely, it is possible to give encrypting effect to the positions of columns having the high column weight.

Figure 5:
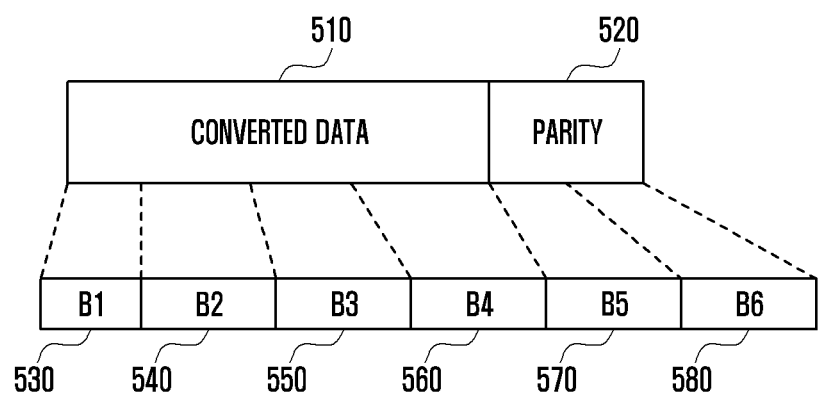
FIG. 5 illustrates a structure of a codeword generated by an ECC encoder of an encryption system according to an embodiment of the present invention.

FIG. 5 illustrates a structure of a codeword generated by an ECC encoder of an encryption system according to an embodiment of the present invention.

Referring to FIG. 5, an encrypting apparatus discriminates (or divides) a codeword including the converted data and parity into certain appropriate sizes. In FIG. 5, the codeword is divided into 6 blocks B1 530, B2 540, B3 550, B4 560, B5 570, and B6 580 and, for convenience sake, it is assumed that B1 530 is a part of the converted data that is punctured so as not to be processed by the repeater 340 illustrated FIG. 3.

Figure 6:
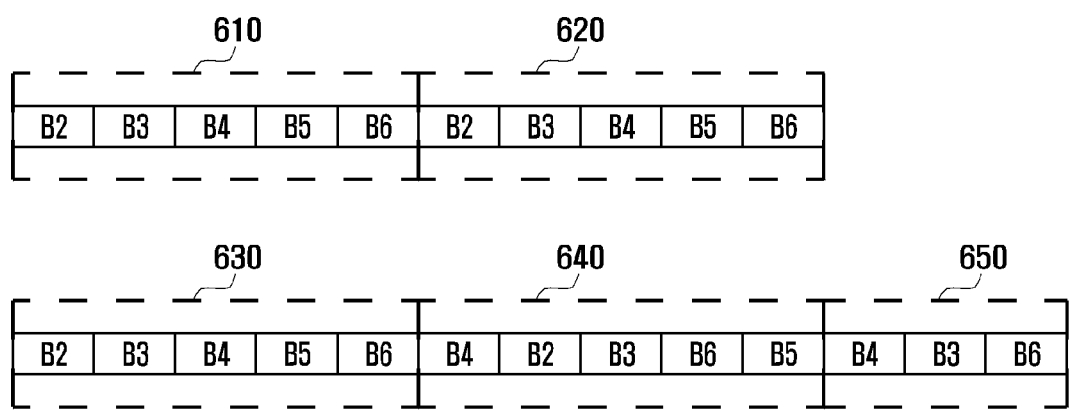
FIG. 6 illustrates a punctured codeword repetition procedure in an encryption system according to an embodiment of the present invention.

FIG. 6 illustrates a punctured codeword repetition procedure in an encryption system according to an embodiment of the present invention.

Referring to FIG. 6, block 610 denotes a codeword including a punctured block B1, block 620 denotes a repetition of the block 610, and blocks 640 and 650 denote irregular repetitions of block 630. Alternatively, in irregular repetition, a block can be repeated with various block arrangements different from those illustrated in FIG. 6.

Using repetition as described above, provides concatenations of the repetition codes and improves the error correction capability, which makes it possible to add more errors and increase encrypting effect, thereby improving the encrypting technique with repetition pattern. However, because this method has a shortcoming in that the parity information is so large as compared to the original data to be encrypted, it may not be applicable to certain system environments.

Figure 7:
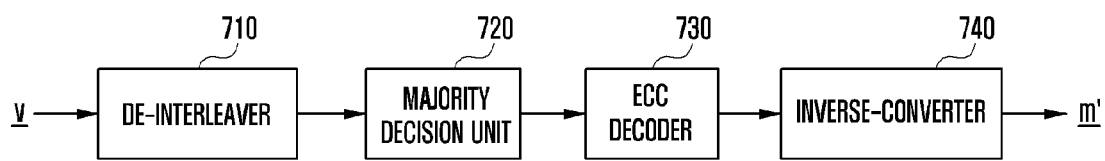
FIG. 7 is a block diagram illustrating a decoding procedure in an encryption system according to an embodiment of the present invention.
Figure 8:
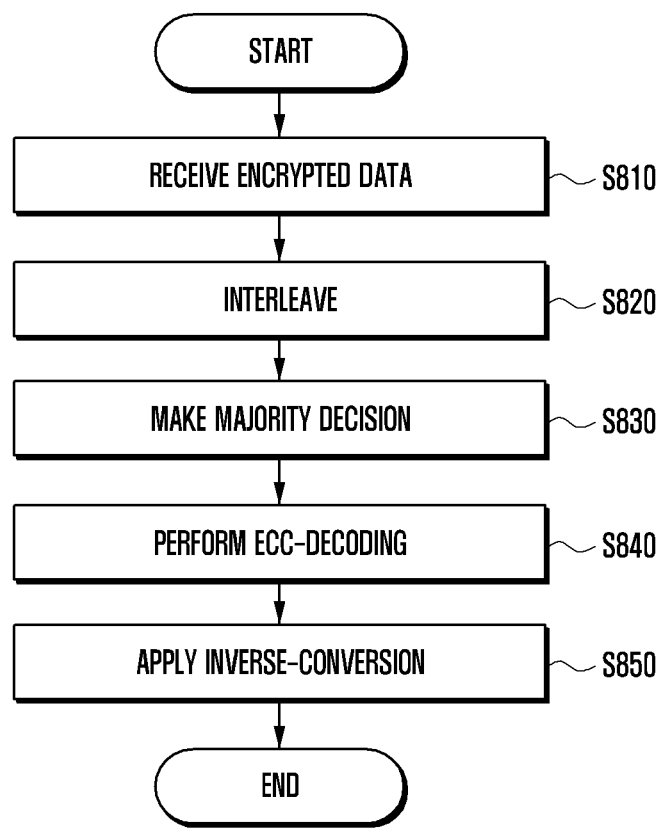
FIG. 8 is a flowchart illustrating a decoding procedure in an encryption system according to an embodiment of the present invention.

FIG. 7 is a block diagram illustrating a configuration of a decoding apparatus of an encrypting system according to an embodiment of the present invention, and FIG. 8 is a flowchart illustrating a decoding procedure of a decoding apparatus according to an embodiment of the present invention.

Referring to FIGS. 7 and 8, the decoding apparatus receives the encrypted data in step S810. In step S820, a de-interleaver 710 performs de-interleaving on the encrypted data to reorder the data.

If the repeater 340 of FIG. 3 is utilized, a majority decision unit 720 performs a majority decision in step S830. However, if the repeater 340 is not utilized, the majority decision step may be omitted. A more detailed description of the majority decision will be provided later.

In step S840, an ECC decoder decodes the majority decision result to recover the codeword with the ECC. Because the input to the ECC decoder 730, after the majority decision, corresponds to the codeword punctured by the puncture unit 330 of FIG. 3, the ECC decoder 730 performs decoding under the assumption that the punctured part has been erased. That is, ECC decoder 730 treats the punctured part as an erasure and continues decoding as if the non-punctured part includes errors.

In step S850, an inverse decoder 740 converts the recovered codeword inversely, thereby recovering the encrypted data.

A majority decision reduces errors included in the repeated and punctured codeword.

For convenience, the description is directed to the repetition case of FIG. 6.

When the repetition denoted by blocks 610 and 620 is made D times, the encrypted data is binary data including bits, the errors generated by the error generator 360 of FIG. 3 are binary errors, and the error rate is A (<½) (i.e. the proportion of 1 in the error vector is A), because the error generator 360 generates errors randomly, the error rate of the bits of the block repeated in FIG. 6 approaches A in average, as the number of repetitions increases. Because A is less than ½, the error rate becomes less than ½ as the number of repetition increases. That is, when repetition is performed D times, the bits of the block incur error less than D/2 in average. Accordingly, it is possible to correctly predict the actual values of the individual bits through a majority decision process.

More specifically, the majority decision of step S830 of FIG. 8 is defined as follows:

1) For the bit values constituting a block, match 0 to the first configuration value (+1) and 1 to the second configuration value (−1);

2) To the bits corresponding to the same positions in the same block, add the values matched in 1); and 3) Assuming that the values acquired through step 2) for individual bits are first result values (E), make decision for a predetermined threshold value TH as follows (TH value changes depending on the system requirement).

E>TH: corresponding bit value is 0
E<−TH: corresponding bit value is 1
TH≤E≤TH: regard corresponding bit as erasure Because the error generator 360 generates errors randomly, there may be the bits incurring errors at an error rate greater than A. Accordingly, if the majority decision process is performed based on the majority principle simply, it is possible to make an incorrect decision. It is noted that the decision is made not with fixed value, but in consideration of an erasure by configuring the threshold value TH in order to prevent the decision from being made incorrectly based on a low reliability of the decision result as much as possible.

According to an embodiment of the present invention, an encrypting system first estimates the values of the bits included in the punctured codeword through the majority decision process and then performs decoding with the input of the estimation result and the result of the punctured bits as an erasure to the decoder 740 of FIG. 7. That is, the decoder 740 performs decoding on a form including errors and an erasure.

Figure 9:
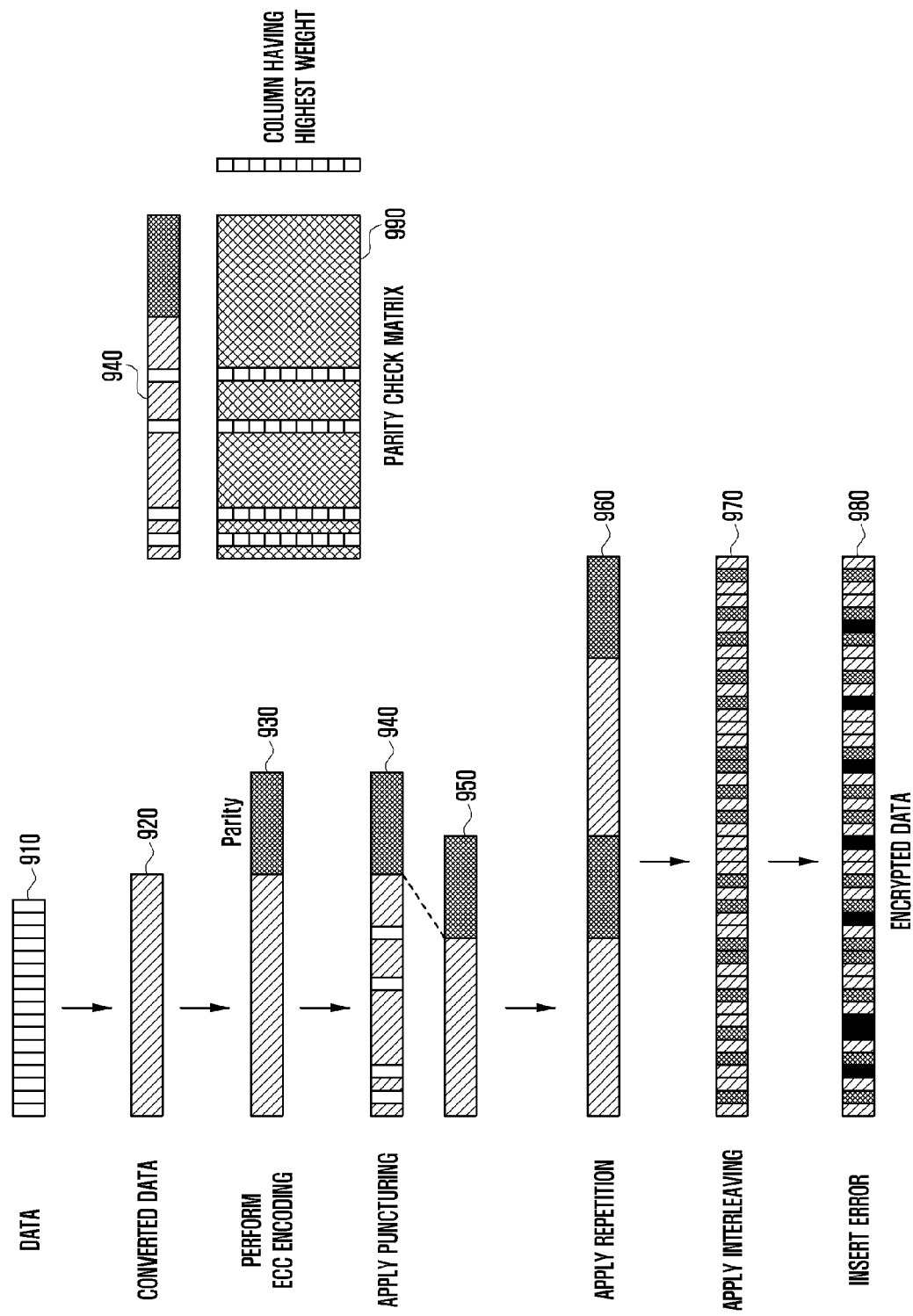
FIG. 9 illustrates a decryption procedure according to an embodiment of the present invention.

FIG. 9 illustrates a decryption procedure according to an embodiment of the present invention.

Referring to FIG. 9, the encrypting apparatus converts data 910 to acquire converted data 920. Here, the original data 910 and the converted data 920 are the same size.

The encrypting apparatus generates a codeword 930 from the converted data 920 with an ECC and then punctures the codeword 903 to output punctured codewords 940 and 950. When using an LDPC code as an ECC, the puncturing position of the punctured code word corresponds to a column having a highest column weight in a parity check matrix 990 of the LDPC code.

The encrypting apparatus applies appropriate repetition to the punctured codeword as denoted by reference number 960, interleaves the repeated codeword as denoted by reference number 970, and then inserts errors as denoted by reference number 980 to output the decrypted data.

Figure 10:
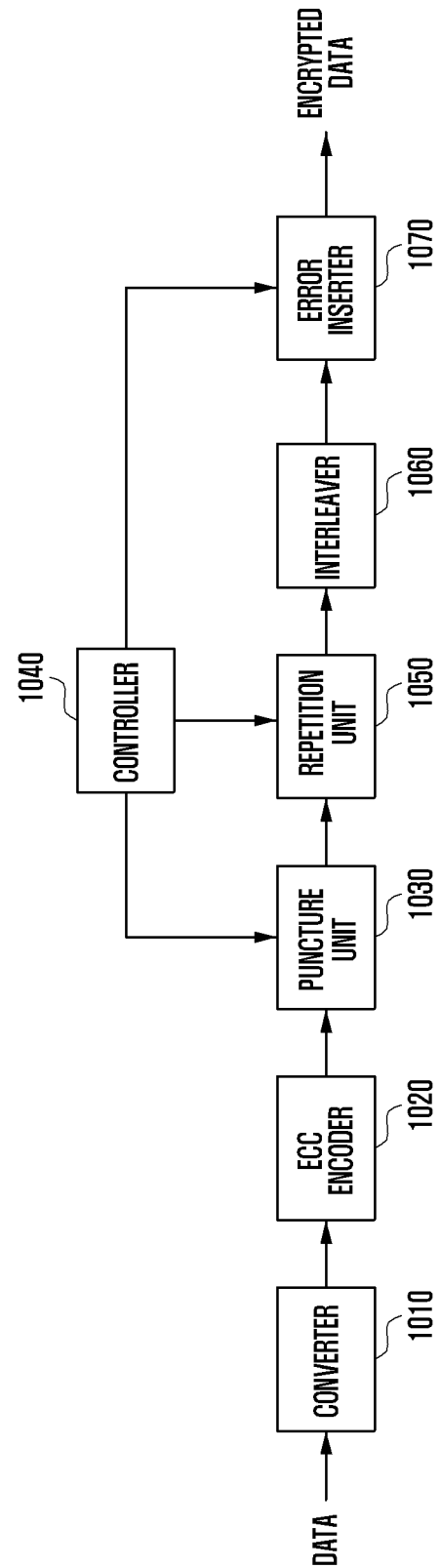
FIG. 10 is a block diagram illustrating an encryption apparatus of an encryption system according to an embodiment of the present invention.

FIG. 10 is a block diagram illustrating an encrypting apparatus for generating encrypted data in an encrypting system based on an ECC according to an embodiment of the present invention.

Referring to FIG. 10, the data to be encrypted is generated and input to a converter 1010. The converter 1010 converts the data with a certain encrypting function. The encrypting function supports inverse conversion. For example, a process of multiplying a matrix having an inverse matrix may be an exemplary conversion process for decrypting.

The converted data is input to an ECC encoder 1020. The ECC encoder performs ECC encoding process on the converted data to generate a codeword. The codeword can be generated in the concatenated form of converted data and parity.

The codeword is input to the puncture unit 1030, e.g., a puncturer, which punctures certain data parts of the converted data included in the codeword. That is, the puncture unit 1030 deletes a part of the converted data. The position and size may be fixed or varied according to the determination of a controller 1040.

The punctured codeword is input to a repetition unit 1050. The repetition unit 1050 repeats a part or the entire of the punctured codeword output by the puncture unit 1030. Here, the repetition unit 1050 performs repetition process according to a predetermined rule or irregularly under the control of the controller 1040. The repetition process may also be omitted depending on the system.

The repeated punctured codeword is input to an interleaver 1060. The interleaver 1060 performs interleaving on the repeated punctured codeword and outputs the interleaved codeword to an error inserter 1070.

The error inserter 1070 generates errors and inserts the errors to the interleaved codeword, thereby generating the encrypted data. Here, the error inserter 1070 may generate a pseudo-random error according to a predetermined rule or insert the error in an irregular manner under the control of the controller 1040.

Figure 11:
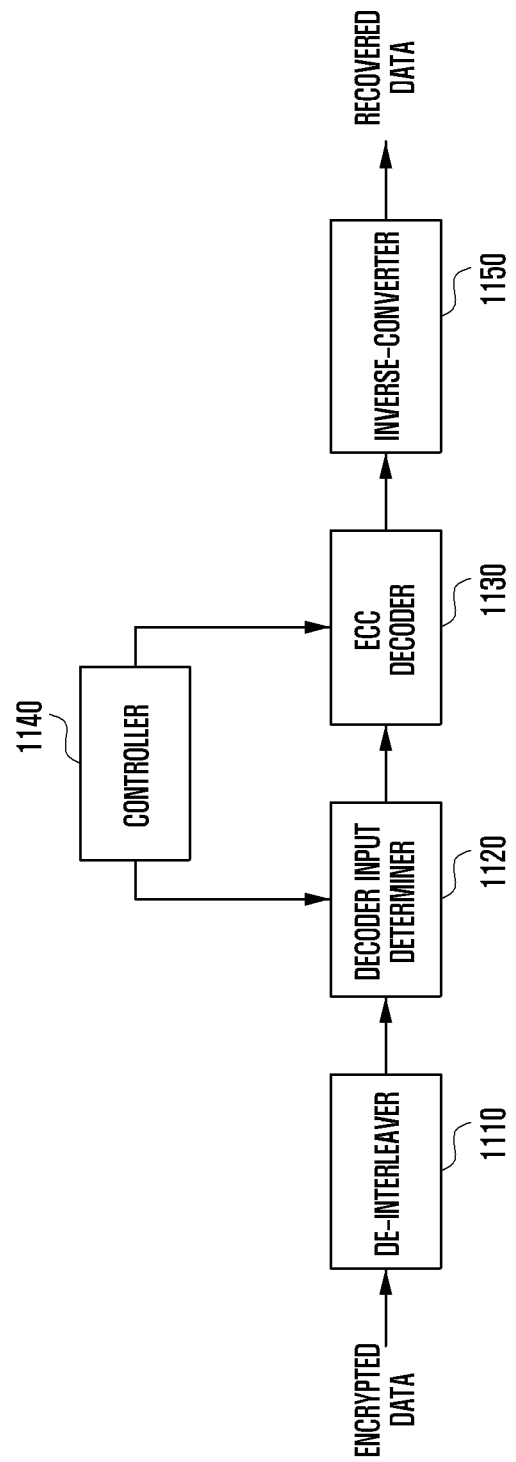
FIG. 11 is a block diagram illustrating a decryption apparatus of an encryption system according to an embodiment of the present invention.

FIG. 11 is a block diagram illustrating an encrypted data decoding apparatus of an encrypting system based on an ECC according to an embodiment of the present invention.

Referring to FIG. 11, the given encrypted data is input to a de-interleaver 1110, which corresponds to an interleaver 1060 as illustrated in FIG. 10. The de-interleaver 1110 performs de-interleaving on the input data to reorder the data.

The de-interleaved data is input to a decoder input determiner 1120, which determines whether to input the de-interleaved data to an ECC decoder 1130. That is, the decoder input determiner 1120 determines whether the encrypted data output by the de-interleaver 1110 is repeated.

Accordingly, when a repetition unit 1050 of an encrypted data generator is omitted, the decoder input determiner 1120 can also be omitted, because the de-interleaved data is delivered to the ECC decoder directly.

When an encrypted data generator as illustrated in FIG. 10 includes the repetition unit 1050, the decoder input determiner 1120 generates an input value to the decoding unit 1130 by applying a majority decision on the encrypted data. For example, the majority decision process can be performed according to a predetermined rule or by applying a variable threshold value under the control of a controller 1140.

More specifically, when repetition has been applied to the encrypted data, the decoder input determiner 1120 sets the first configuration value to 0 and the second configuration value to 1 for the individual bit values of a block. The decoder input determiner 1120 adds the configuration values to the corresponding bits at the same positions in the block and compares the result values obtained by adding the configuration values to the individual bits with a predetermined threshold value to determine the final values of the individual bits. The decoder input determiner 1120 inputs the determined final values to the ECC decoder 1130.

If the determination result of the decoder input determiner 1120 is input to the ECC decoder 1130, the ECC decoder 1130 regards the punctured position as an erasure and continues decoding the punctured data. The positions of the erasure may be predetermined or, when irregular puncturing is applied, determined under the control of the controller 1140. The decoding result is inversely-converted by an inverse converter 1150, thereby recovering the original data.

As described above, an ECC-based encrypting system in accordance with an embodiment of the present invention is capable of increasing the encrypting level by puncturing a part of the codeword generated by an ECC encoder.

Further, the ECC-based encrypting system is capable of increasing an encrypting level by increasing an error correction capability using a repetition process appropriate to the punctured codeword in generating encrypted data.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A data encryption method of an Error Correction Code (ECC)-based encryption apparatus, the data encryption method comprising:
converting data to be encrypted using a certain encryption function;
generating a codeword by performing ECC encoding on the converted data;
puncturing a part of the converted data included in the codeword;
repeating at least a part of the punctured codeword,
interleaving the punctured data; and
inserting errors to the interleaved data.

2. The data encryption method of claim 1, wherein repeating comprises iterating at least one block of the punctured codeword.

3. The data encryption method of claim 1, wherein generating the codeword comprises encoding the data with a Low Density Parity Check (LDPC) code.

4. The data encryption method of claim 3, wherein puncturing the part of the converted data included in the codeword comprises puncturing a part of information corresponding to columns having high column weights in a parity check matrix of the LDPC code.

5. An encryption apparatus for encrypting data based on an Error Correction Code (ECC), the encryption apparatus comprising:
a converter that converts data to be encrypted using a certain encryption function;
an encoder that generates a codeword by encoding the converted data with the ECC;
a puncture unit that punctures a part of the converted data included in the codeword;
a repeater that repeats at least a part the punctured codeword generated by the puncture unit,
an interleaver that interleaves the punctured data; and
an error inserter that inserts errors to the interleaved data.

6. The encryption apparatus of claim 5, wherein the repeater iterates at least one block of the punctured codeword.

7. The encryption apparatus of claim 5, wherein the encoder encodes the data with a Low Density Parity Check (LDPC) code.

8. The encryption apparatus of claim 7, wherein the puncture unit punctures a part of information corresponding to columns having high column weights in a parity check matrix of the LDPC code.

9. A data decryption method for decrypting encrypted data including blocks in an Error Correction Code (ECC)-based encryption system, the data decryption method comprising:
de-interleaving the encrypted data;
decoding the de-interleaved data to recover a codeword; and
converting the codeword to recover the encrypted data,
wherein converting comprises treating a punctured block of the encrypted data as an erasure and treating a non-punctured block of the encrypted data as a block including errors.

10. The data decryption method of claim 9, further comprising:
determining, after de-interleaving, whether any part of the encrypted data is repeated;
configuring 0 bits of a block as first configuration values and 1 bits of the block as second configuration values, when any part of the encrypted data is repeated;
adding the configuration values to corresponding bits at same positions of the block;
determining final values of the corresponding bits by comparing values obtained by adding the configuration values with a predetermined threshold value for individual bits; and
inputting the determined final values as input values of an error correction code decoding process.

11. A decryption apparatus for decrypting encrypted data including blocks in an Error Correction Code (ECC)-based encryption system, the decryption apparatus comprising:
a de-interleaver that de-interleaves the encrypted data;
a decoder that decodes the de-interleaved data to recover a codeword; and
an inverse-converter that converts the codeword to recover the encrypted data,
wherein the decoder treats a punctured block of the encrypted data as an erasure and treats a non-punctured block of the encrypted data as a block including errors.

12. The decryption apparatus of claim 11, further comprising a decoder input determiner that determines whether the encrypted data output by the de-interleaver is repeated.

13. The decryption apparatus of claim 12, wherein the decoder input determiner inputs the encrypted data output by the de-interleaver to the decoder, when the encrypted data is not repeated.

14. The decryption apparatus of claim 12, wherein, when the encrypted data is repeated, the decoder input determiner configures 0 bits of a block as first configuration values and 1 bits of the block as second configuration values, adds the configuration values to corresponding bits at same positions of the block, determines final values of the corresponding bits by comparing values obtained by adding the configuration values with a predetermined threshold value for individual bits, and inputs the determined final values as input values of an error correction code decoding process.

* * * * *